(12) United States Patent
Yu et al.

(10) Patent No.: US 11,909,163 B1
(45) Date of Patent: Feb. 20, 2024

(54) RADIO FREQUENCY LASER

(71) Applicant: Jilin Yongli Laser Technology Co., Ltd., Changchun (CN)

(72) Inventors: Yang Yu, Changchun (CN); Jie Liu, Changchun (CN); Huili Sun, Changchun (CN); Zhicheng Zhang, Changchun (CN); Qingdong Cui, Changchun (CN); Shangyong Sun, Changchun (CN)

(73) Assignee: Jilin Yongli Laser Technology Co., Ltd., Changchun (CN)

( * ) Notice: Subject to any disclaimer, the term of this patent is extended or adjusted under 35 U.S.C. 154(b) by 0 days.

(21) Appl. No.: 18/500,507

(22) Filed: Nov. 2, 2023

(30) Foreign Application Priority Data

Jul. 26, 2023 (CN) .......................... 202310923287.4

(51) Int. Cl.
| | |
|---|---|
| H01S 1/06 | (2006.01) |
| H01S 3/0971 | (2006.01) |
| H01S 3/22 | (2006.01) |
| H01S 3/03 | (2006.01) |
| H01S 3/223 | (2006.01) |
| H01S 3/038 | (2006.01) |

(52) U.S. Cl.
CPC ................. *H01S 1/06* (2013.01); *H01S 3/03* (2013.01); *H01S 3/038* (2013.01); *H01S 3/0971* (2013.01); *H01S 3/22* (2013.01); *H01S 3/2232* (2013.01)

(58) Field of Classification Search
CPC ...... H01S 3/2232; H01S 3/0315; H01S 3/041; H01S 3/038; H01S 3/09702; H01S 3/0971; H01S 3/0385; H01S 3/03; H01S 1/06; G02B 6/4279

See application file for complete search history.

(56) References Cited

U.S. PATENT DOCUMENTS

| | | | |
|---|---|---|---|
| 2009/0004918 A1* | 1/2009 | Papanide ................. | H03H 7/38 333/32 |
| 2013/0163917 A1 | 6/2013 | Amirkiai et al. | |
| 2023/0320047 A1* | 10/2023 | Khamehchi ............... | H01S 3/22 174/350 |

FOREIGN PATENT DOCUMENTS

| | | |
|---|---|---|
| CN | 101102659 A | 1/2008 |
| CN | 205623064 U | 10/2016 |
| CN | 106898936 A | 6/2017 |

(Continued)

OTHER PUBLICATIONS

First Office Action issued in counterpart Chinese Patent Application No. 202310923287.4, dated Aug. 31, 2023.

(Continued)

*Primary Examiner* — Ryan Johnson
(74) *Attorney, Agent, or Firm* — Westbridge IP LLC (57) ABSTRACT

A radio frequency laser includes: a power box, a radio frequency cavity, an electrode, and a first metal blocking ring. A bottom plate of the power box is provided with a first installation hole and a first installation groove, and the first installation groove is arranged around the first installation hole. A top plate of the radio frequency cavity is provided with a second installation hole and a second installation groove, and the second installation groove is arranged around the second installation hole. When the power box is assembled with the radio frequency cavity, the second installation hole corresponds to the first installation hole, and the second installation groove corresponds to the first installation groove.

9 Claims, 6 Drawing Sheets

(56) References Cited

FOREIGN PATENT DOCUMENTS

| | | |
|---|---|---|
| CN | 206833322 U | 1/2018 |
| CN | 211378663 U | 8/2020 |
| CN | 215220270 U | 12/2021 |
| CN | 217387675 U | 9/2022 |
| CN | 115621829 A | 1/2023 |
| CN | 219122802 U | 6/2023 |

OTHER PUBLICATIONS

Liu et al., A Preliminary Study on the Key Points of Quality Control in Construction Project Management, Theoretical Research in Urban Construction, 2017, 4, pp. 112-113, dated Feb. 5, 2017.

* cited by examiner

RADIO FREQUENCY LASER

CROSS-REFERENCE TO RELATED APPLICATIONS

This application claims priority to Chinese Patent Application No. 202310923287.4, filed on Jul. 26, 2023, the content of which is incorporated herein by reference in its entirety.

TECHNICAL FIELD

The present disclosure relates to a field of laser technology, in particular to a radio frequency laser.

BACKGROUND

Radio frequency laser is a type of laser that may be applied in fields of cutting, marking, drilling, glass and ceramic processing, thin metal cutting, flight marking, 3D printing and other technologies.

With the development of science and technology and a progress of the times, a safety of use of the radio frequency laser is increasingly emphasized in practical applications. An existing radio frequency laser on the market may have a connection gap through which an electromagnetic radiation may overflow, and the electromagnetic radiation overflowing to an external environment may affect physical and mental health of workers, which is not in line with a purpose of a safe use of the radio frequency laser.

SUMMARY

An objective of the present disclosure is to provide a radio frequency laser to address technical problems in a related art. A specific solution is as follows.

The embodiments of the present disclosure provide a radio frequency laser, including: a power box including a bottom plate, wherein the bottom plate is provided with a first installation hole and a first installation groove, and the first installation groove is arranged around the first installation hole; a radio frequency cavity configured to store gas, wherein the radio frequency cavity includes a top plate provided with a second installation hole and a second installation groove, the second installation groove is arranged around the second installation hole, and when the power box is assembled with the radio frequency cavity, the second installation hole corresponds to the first installation hole, and the second installation groove corresponds to the first installation groove; an electrode, wherein one end of the electrode is arranged in the first installation hole, and at least part of the other end of the electrode passes through the second installation hole and extends into the radio frequency cavity to ionize the gas; and a first metal blocking ring, wherein the first metal blocking ring is arranged in the first installation groove and the second installation groove to prevent an electromagnetic radiation from overflowing through a gap between the bottom plate and the top plate.

In some embodiments, the bottom plate is further provided with a third installation groove arranged around the first installation groove; the top plate is further provided with a fourth installation groove arranged around the second installation groove; when the power box is assembled with the radio frequency cavity, the third installation groove corresponds to the fourth installation groove; and a second metal blocking ring is provided in the third installation groove and the fourth installation groove to prevent an electromagnetic radiation from overflowing through a gap around the first metal blocking ring.

In some embodiments, a height of the second metal blocking ring is above a height of the first metal blocking ring in a height direction of the radio frequency laser.

In some embodiments, the radio frequency laser further includes an elastic member provided on a side of the first metal blocking ring and/or the second metal blocking ring away from the power box, and the elastic member is configured to allow the first metal blocking ring and/or the second metal blocking ring to have a trend of approaching the power box, so as to reduce a gap between the power box and a top end of the first metal blocking ring and/or the second metal blocking ring.

In some embodiments, the power box further includes: a top cover, wherein a first concave-convex structure is provided around an edge of the top cover; and a frame, wherein two planes of the frame are connected to the top cover and the bottom plate respectively, a second concave-convex structure is provided on an outer edge on a side of the frame away from the bottom plate, and the second concave-convex structure is arranged around an outer edge of a top surface of the frame; the second concave-convex structure corresponds to the first concave-convex structure, and the first concave-convex structure and the second concave-convex structure form a radiation protection structure to attenuate an intensity of an electromagnetic radiation overflowing through a gap between the edge of the top cover and a top end of the frame.

In some embodiments, the first concave-convex structure includes a top cover body, a top cover side wall, and a top cover end portion; and a first blind groove is formed between the top cover end portion and the top cover body, the first blind groove is arranged around an outer edge of the top cover body, and the first blind groove includes a first side wall, a second side wall, and a first bottom surface.

In some embodiments, the second concave-convex structure includes: a first end surface arranged around an outer edge of the top end of the frame; a second end surface arranged around an inner edge of the top end of the frame; and a second blind groove arranged between the first end surface and the second end surface and formed in a direction from the first end surface to the bottom plate; the second blind groove includes a third side wall, a fourth side wall, and a second bottom surface, and a height of the first end surface is below a height of the second end surface.

In some embodiments, the radiation protection structure meets relationships of: $D1 \geq 20H$; $D2 \geq 20H$; $A1 = B1 + H = \frac{1}{2}D1$; $A2 = B2 + H = \frac{1}{2}D2$, where $D1$ represents a distance between an inner side wall of the frame and the first bottom surface, $D2$ represents a distance between the second end surface and the second bottom surface, $A1$ represents a width of the second end surface, $A2$ represents a thickness of the top cover end portion, $B1$ represents a depth of the first blind groove, $B2$ represents a depth of the second blind groove, and $H$ represents a distance between a lower surface of the top cover end portion and the first end surface.

In some embodiments, the electromagnetic radiation is allowed to enter into the radiation protection structure to form a reflective transmission, a first reflection coefficient in the first blind groove is £1, and the first reflection coefficient £1 meets a relationship of $£1 = (D1−H)/D1$.

In some embodiments, the electromagnetic radiation is allowed to enter into the radiation protection structure to form a reflective transmission, a second reflection coefficient in the second blind groove is £2, and the second reflection coefficient £2 meets a relationship of $£2 = (D2−H)/D2$.

Compared with the related art, the above solutions of the embodiments of the present disclosure have at least the following beneficial effects.

In the present disclosure, a first metal blocking ring is provided inside the radio frequency laser to prevent an electromagnetic radiation from overflowing through the gap between the bottom plate and the top plate, so as to ensure the safety of workers when using the radio frequency laser. The radio frequency laser has a simple and compact structure, a low production cost and a high practicability, and may effectively prevent an overflow of electromagnetic radiation and prevent an electromagnetic radiation from harming the physical and mental health of workers.

It should be understood that the above general description and the following detailed description are just exemplary and explanatory, and do not limit the present disclosure.

BRIEF DESCRIPTION OF THE DRAWINGS

The accompanying drawings here are incorporated into the specification and form a part of the specification, showing embodiments that comply with the present disclosure, and are used together with the specification to explain principles of the present disclosure. Obviously, the accompanying drawings in the following description are just some embodiments of the present disclosure. For those ordinary skilled in the art, other drawings may be obtained according to these accompanying drawings without exerting any inventive effort.

DETAILED DESCRIPTION OF THE EMBODIMENTS

In order to make objectives, technical solutions and advantages of the present disclosure more apparent, the present disclosure will be described in further detail below with reference to the accompanying drawings. Obviously, the described embodiments are just some not all of the embodiments of the present disclosure. Based on the embodiments in the present disclosure, all other embodiments obtained by those ordinary skilled in the art without exerting inventive effort fall within the scope of protection of the present disclosure.

The terms used in the embodiments of the present disclosure are just for the purpose of describing specific embodiments and are not intended to limit the present disclosure. The singular forms such as "a" and "the" used in the embodiments of the present disclosure and the appended claims are also intended to include plural forms, unless the context clearly indicates other meanings. "A plurality of" generally includes at least two, and other quantifiers are similar.

As is well known, an interaction of an electric field and a magnetic field may generate an electromagnetic wave, and an electromagnetic radiation is a propagation of energy into space in a form of the electromagnetic wave. It is well known that light is also an electromagnetic wave. Due to different frequencies of light, light may be perceived by people in different ways, and visible light is a visible electromagnetic wave. Visible light and invisible electromagnetic waves transmit energy in the same way. The two have the same essence, and both have wave-particle duality. Reflection, refraction, diffraction, scattering, absorption and other properties may occur under specific conditions.

In a related art, no radiation protection structure is formed inside a power box and a radio frequency cavity of a radio frequency laser. Therefore, in practical applications, there is a high possibility of a technical problem of an electromagnetic radiation leakage from an installation gap, which poses a threat to the physical and mental health of workers.

The present disclosure provides a radio frequency laser, including: a power box 100 including a bottom plate 130, where the bottom plate 130 is provided with a first installation hole 131 and a first installation groove 132, and the first installation groove 132 is arranged around the first installation hole 131; a radio frequency cavity 200 used to store gas, where the radio frequency cavity 200 includes a top plate 210, which is provided with a second installation hole 211 and a second installation groove 212 arranged around the second installation hole 211, and when the power box 100 is assembled with the radio frequency cavity 200, the second installation hole 211 corresponds to the first installation hole 131, and the second installation groove 212 corresponds to the first installation groove 132; an electrode 300, where one end of the electrode 300 is arranged in the first installation hole 131, and at least part of the other end of the electrode 300 passes through the second installation hole 211 and extends into the radio frequency cavity 200 to ionize the gas; and a first metal blocking ring 400 arranged in the first installation groove 132 and the second installation groove 212 to prevent an electromagnetic radiation from overflowing through a gap between the bottom plate 130 and the top plate 210.

In the present disclosure, the radio frequency laser is provided with the first metal blocking ring 400, which is used to prevent an electromagnetic radiation from overflowing through the gap between the bottom plate 130 and the top plate 210, so as to ensure the safety of workers when using the radio frequency laser.

In view of this, optional embodiments of the present disclosure will be described in detail below with reference to the accompanying drawings.

Figure 1:
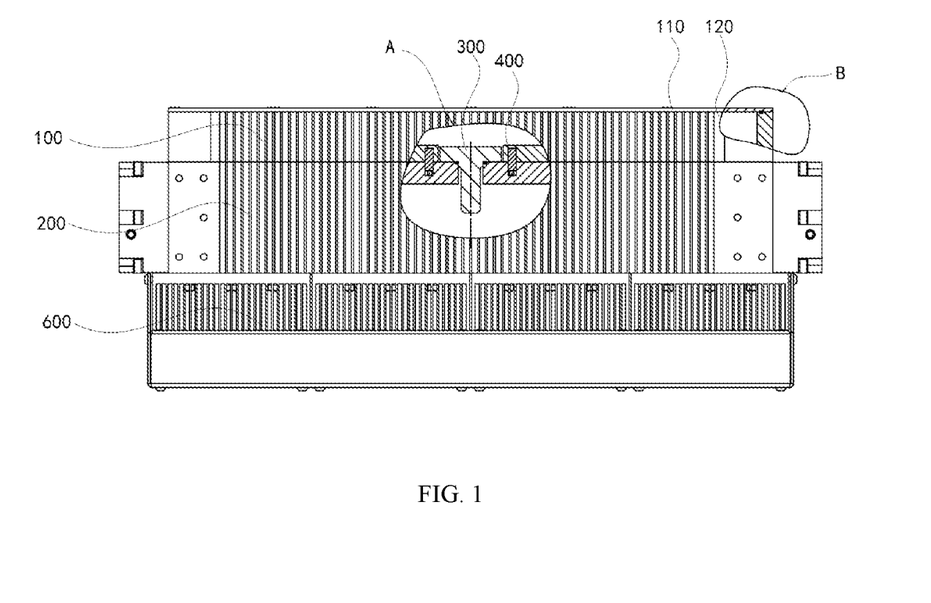
FIG. 1 shows a schematic structural diagram of a radio frequency laser according to an exemplary embodiment.

FIG. 1 shows a schematic structural diagram of a radio frequency laser according to an exemplary embodiment. As shown in FIG. 1, the embodiments of the present disclosure provide a radio frequency laser, including a power box 100, a radio frequency cavity 200, an electrode 300, a first metal blocking ring 400, and a heat sink 600.

The power box 100 is connected to the radio frequency cavity 200 and supplies power to an interior of the radio frequency cavity 200 to ionize the gas inside the radio frequency cavity 200. As a result, a large amount of heat may be generated inside the radio frequency cavity 200, and there is a need to provide a heat dissipation structure to dissipate heat for the radio frequency cavity 200. Furthermore, to avoid danger caused by an excessive temperature, the heat sink 600 is connected to the radio frequency cavity 200 to dissipate heat for the radio frequency cavity 200, so as to ensure a normal operation of the radio frequency cavity 200 when the power box 100 supplies power to the radio frequency cavity 200.

In some embodiments, the power box 100 includes a bottom plate 130, which is provided with a first installation hole 131 and a first installation groove 132. The first installation hole 131 is connected to an interior of the power box 100, and a circuit board inside the power box 100 is suitable for connecting to the electrode 300 through the first installation hole 131. The first installation groove 132 is arranged around the first installation hole 131 to place the first metal blocking ring 400, so as to prevent an overflow of the electromagnetic radiation.

In some embodiments, the radio frequency cavity 200 is used to store gas. A gas composition in the radio frequency cavity 200 is not limited in the present disclosure. The gas may be carbon dioxide or any other gas that may be applied to radio frequency laser technology. The gas may include one type of gas or a plurality of types of gas.

Figure 2:
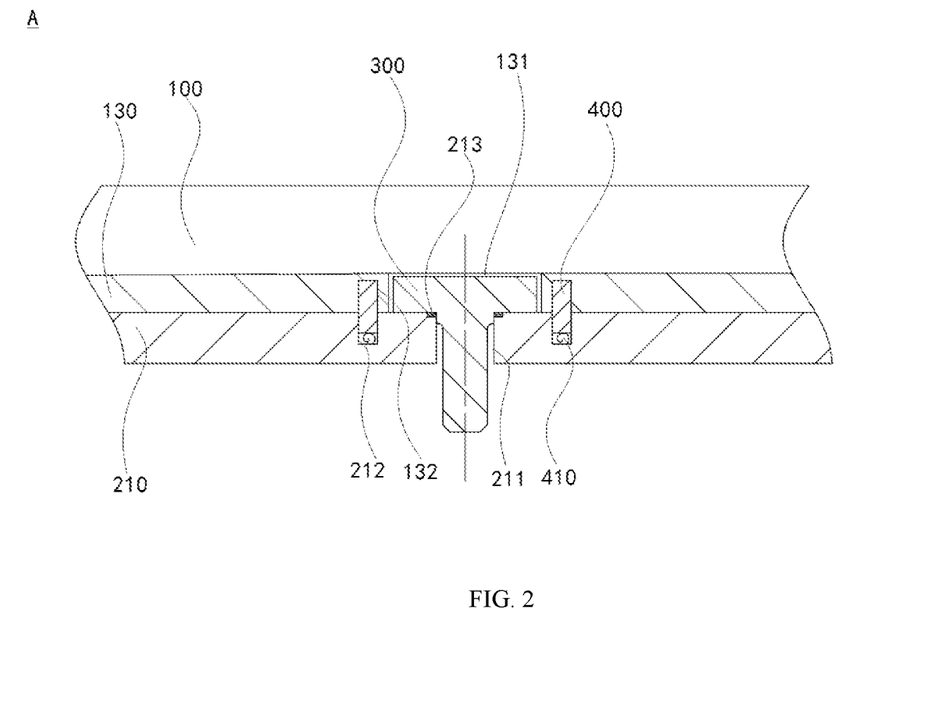
FIG. 2 shows a partial enlarged view of part A in FIG. 1.
Figure 3:
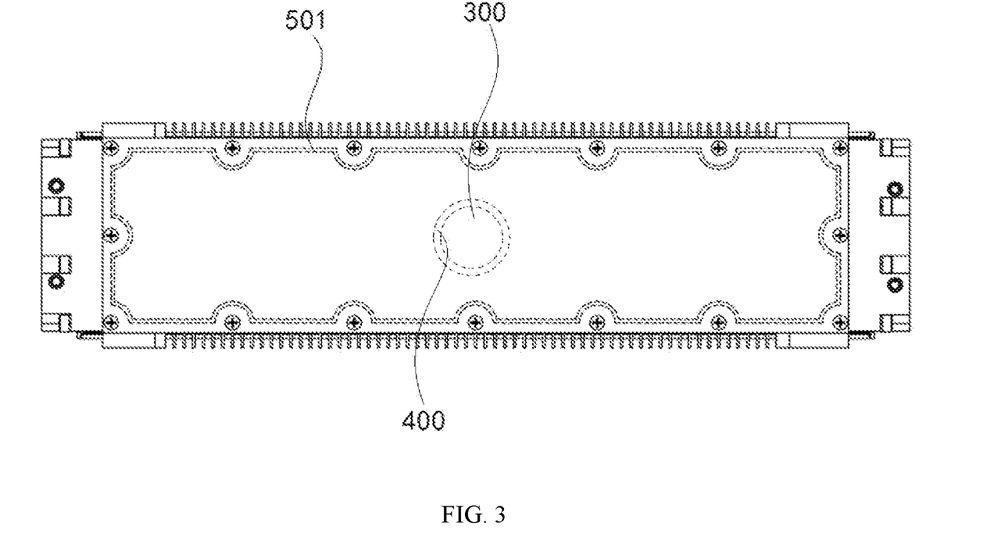
FIG. 3 shows a top view of a radio frequency laser according to an exemplary embodiment.

FIG. 2 shows a partial enlarged view of part A in FIG. 1, and FIG. 3 shows a top view of a radio frequency laser according to an exemplary embodiment. As shown in FIG. 2 and FIG. 3, the radio frequency cavity 200 includes a top plate 210, which is provided with a second installation hole 211 and a second installation groove 212, and the second installation groove 212 is arranged around the second installation hole 211. When the power box 100 is assembled with the radio frequency cavity 200, the second installation hole 211 corresponds to the first installation hole 131.

Specifically, the second installation hole 211 connects the interior of the radio frequency cavity 200 with the first installation hole 131, that is, the first installation hole 131 and the second installation hole 211 connect the interior of the power box 100 with the interior of the radio frequency cavity 200. The circuit board inside the power box 100 may supply power to the electrode 300, so that the electrode 300 may ionize the gas in the radio frequency cavity 200.

After the power box 100 is assembled with the radio frequency cavity 200, the second installation groove 212 corresponds to the first installation groove 132 to form an installation space for installing the first metal blocking ring 400.

In some embodiments, the electrode 300 is constructed in a T-shaped structure. One end of the electrode 300 is arranged in the first installation hole 131 and is electrically connected to a high-voltage excitation circuit inside the power box 100. At least part of the other end of the electrode 300 passes through the second installation hole 211 and extends into the radio frequency cavity 200. For example, an end portion of the electrode 300 extends into the radio frequency cavity 200 to ionize the gas in the radio frequency cavity 200.

Specifically, one end of the electrode 300 is arranged in the first installation hole 131 and connected to the circuit board inside the power box 100. The power box 100 is used to supply power to the electrode 300, so that the part of the electrode 300 extending into the radio frequency cavity 200 may ionize the gas in the radio frequency cavity 200, thereby generating gain substances for the radio frequency laser.

In some embodiments, an indium coil 213 is provided at an edge portion of the second installation hole 211 connected to the electrode 300. The indium coil 213 has a reflection effect and may reflect an electromagnetic radiation back onto the electrode 300 to prevent the electromagnetic radiation from overflowing. When the electrode 300 ionizes the gas, part of the electromagnetic radiation may overflow to the edge of the second installation hole 211. In this case, the indium coil 213 may reflect the part of the electromagnetic radiation into the radio frequency cavity 200 and onto the electrode 300, thereby preventing the electromagnetic radiation from overflowing along a gap between the bottom plate 130 and the top plate 210.

In some embodiments, an electromagnetic radiation may be generated when the power box 100 supplies power to the electrode 300, and the electromagnetic radiation may overflow from a connection gap between the power box 100 and the radio frequency cavity 200. In view of this, a first metal blocking ring 400 is further provided in the present disclosure. The first metal blocking ring 400 has a smooth surface and may be constructed as a silver blocking ring. The silver blocking ring has a larger conductivity than aluminum alloy.

The first metal blocking ring 400 is arranged in the first installation groove 132 and the second installation groove 212 to prevent an electromagnetic radiation from overflowing through the gap between the bottom plate 130 and the top plate 210.

After an electromagnetic radiation overflows from a gap at the edge of the electrode 300, the electromagnetic radiation may overflow from the gap between the bottom plate 130 and the top plate 210. The first metal blocking ring 400 arranged in the first installation groove 132 and the second installation groove 212 may block the electromagnetic radiation from overflowing along the gap between the bottom plate 130 and the top plate 210, so as to achieve a radiation protection effect.

Figure 4:
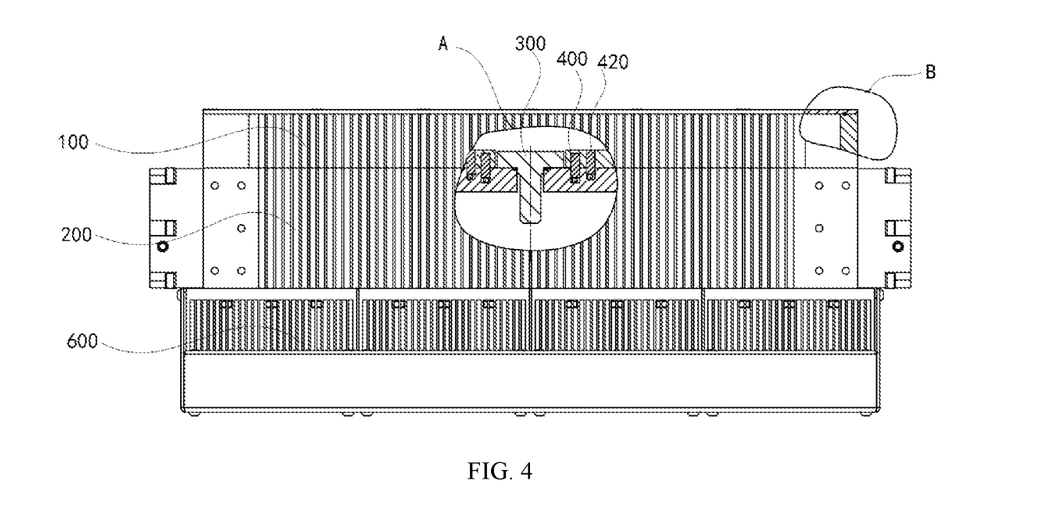
FIG. 4 shows a schematic structural diagram of another radio frequency laser according to an exemplary embodiment.

In other embodiments, FIG. 4 shows a schematic structural diagram of another radio frequency laser according to an exemplary embodiment. As shown in FIG. 4, the bottom plate 130 is further provided with a third installation groove 133, which is arranged around the first installation groove 132. The top plate 210 is further provided with a fourth installation groove 214, which is arranged around the second installation groove 212. When the power box 100 is assembled with the radio frequency cavity 200, the third installation groove 133 corresponds to the fourth installation groove 214, and the third installation groove 133 and the fourth installation groove together form a second installation space for installing the second metal blocking ring 420.

The radio frequency laser may further include a second metal blocking ring 420, which is arranged in the third installation groove 133 and the fourth installation groove 214 to prevent an electromagnetic radiation from overflowing through a gap around the first metal blocking ring 400.

In some embodiments, the second metal blocking ring 420 is arranged around the first metal blocking ring 400, and a height of the second metal blocking ring 420 is above a height of the first metal blocking ring 400.

Figure 5:
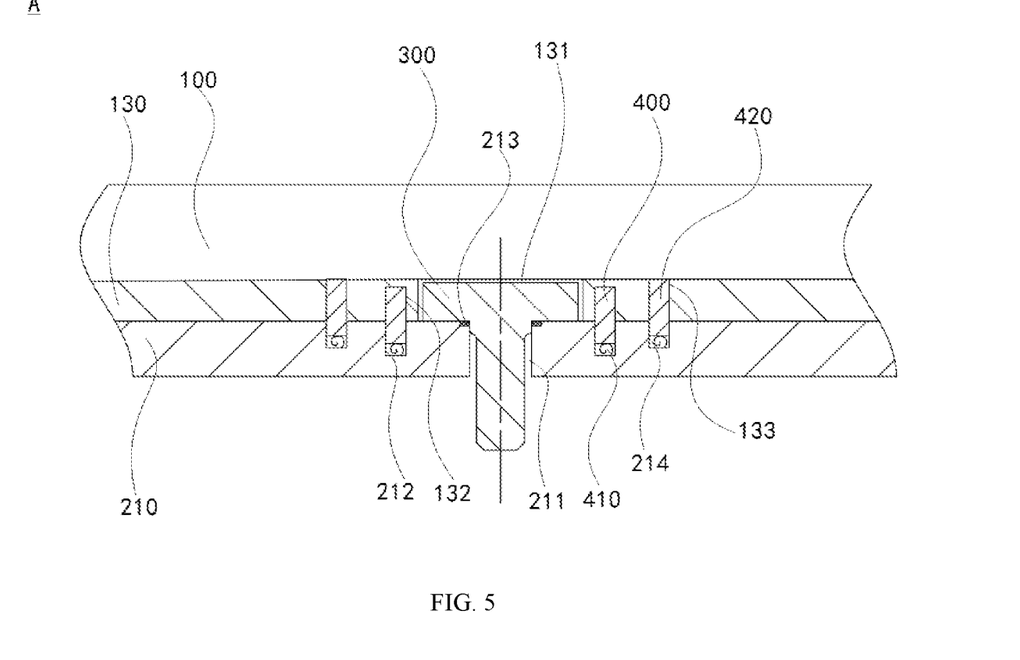
FIG. 5 shows a partial enlarged view of part A in FIG. 4.
Figure 6:
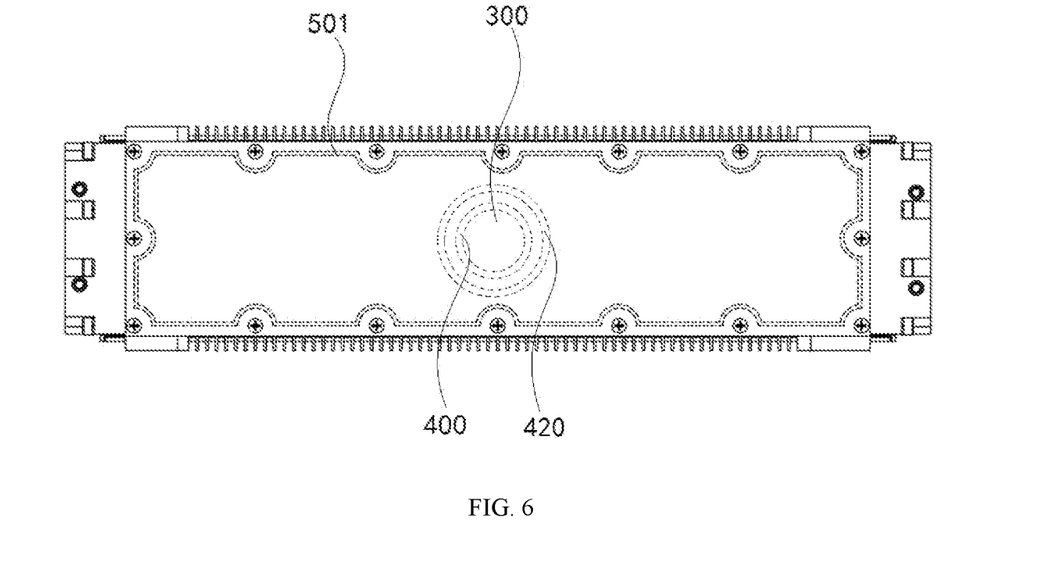
FIG. 6 shows a top view of another radio frequency laser according to an exemplary embodiment.

Specifically, in a height direction of the radio frequency laser, the height of the second metal blocking ring 420 may be above the height of the first metal blocking ring 400. FIG. 5 shows a partial enlarged view of part A in FIG. 4, and FIG. 6 shows a top view of the radio frequency laser according to the embodiments in FIG. 5. As shown in FIG. 5 and FIG. 6, the second metal blocking ring 420 is arranged around the first metal blocking ring 400.

Furthermore, if a gap is formed between the first metal blocking ring 400 and the bottom plate 130, an electromagnetic radiation may overflow into the gap between the bottom plate 130 and the top plate 210 through the gap between the first metal blocking ring 400 and the bottom plate 130, so that the first metal blocking ring 400 may not completely block the overflow of the electromagnetic radiation.

In this case, by providing the second metal blocking ring 420 on the outer side of the first metal blocking ring 400, the electromagnetic radiation leaked from the outer side of the first metal blocking ring 400 may be blocked by the second metal blocking ring 420, so that the overflow of the electromagnetic radiation may be effectively prevented.

In some embodiments, the radio frequency laser further includes an elastic member 410. Furthermore, the elastic element 410 may be a spring, an elastic piece, etc.

As shown in FIG. 2 and FIG. 5, the elastic member 410 may be arranged on a side of the first metal blocking ring 400 and/or the second metal blocking ring 420 away from the power box 100, that is, the elastic member 410 may be arranged at a lower end of the first metal blocking ring 400 and/or the second metal blocking ring 420. The elastic member 410 is configured to allow the first metal blocking ring 400 and/or the second metal blocking ring 420 to have a trend of approaching the power box 100, so as to reduce a gap between the power box 100 and a top end of the first metal blocking ring 400 and/or the second metal blocking ring 420, thereby preventing an electromagnetic radiation from overflowing through a connection gap between the bottom plate 130 of the power box 100 and the top plate 210 of the radio frequency cavity 200.

In other embodiments, the elastic member 410 may be arranged at an upper end of the second metal blocking ring 420. When the power box 100 is assembled with the radio frequency cavity 200, the elastic member 410 has a function of buffering an external force and supporting the first metal blocking ring 400 or the second metal blocking ring 420, thereby preventing an electromagnetic radiation leaked from the first metal blocking ring 400 from overflowing through the connection gap between the bottom plate 130 of the power box 100 and the top plate 210 of the radio frequency cavity 200.

A connection method between the elastic member 410 and the first metal blocking ring 400 or the second metal blocking ring 420 is not limited in the present disclosure. The connection may be a fixed connection between the elastic member 410 and the bottom plate 130 or the top plate 210, or a fixed connection between the elastic member 410 and the first metal blocking ring 400 or the second metal blocking ring 420, or may be any one or more other connection methods by which the first metal blocking ring 400 and the second metal blocking ring 420 may block the gap between the bottom plate 130 and the top plate 210.

In some embodiments, as shown in FIG. 1, the power box 100 further includes a top cover 110 and a frame 120. The frame 120 is constructed as a hollow structure surrounded by four side walls, and a circuit board connected to the electrode 300 is provided inside the frame 120. A bottom of the frame 120 is fixedly connected or integrally formed with the bottom plate 130 of the power box 100, and the top cover 110 may be fixedly connected to the frame 120 through a screw structure, as shown in FIG. 6, so as to seal the circuit board inside the frame 120.

Figure 9:
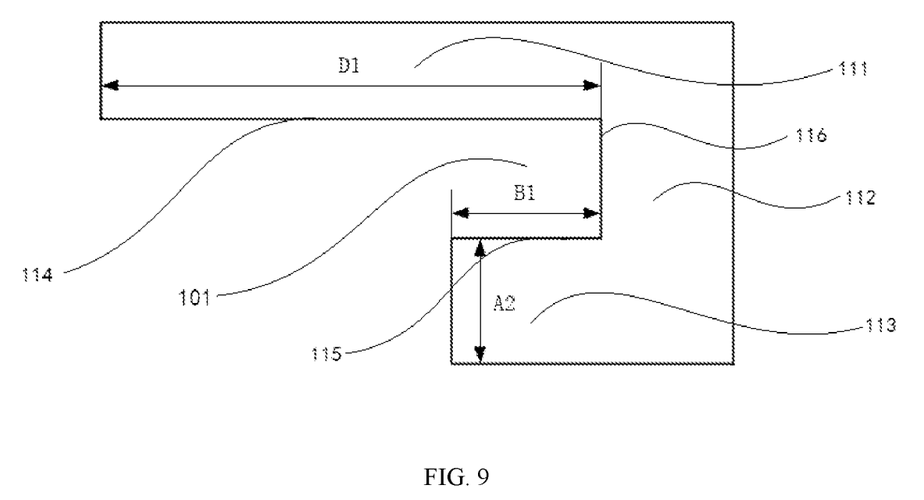
FIG. 9 shows a schematic structural diagram of a first concave-convex structure according to an exemplary embodiment.

In some embodiments, FIG. 9 shows a schematic structural diagram of a first concave-convex structure according to an exemplary embodiment. As shown in FIG. 9, the first concave-convex structure is arranged around an edge of the top cover 110 and avoids a screw installation hole used for a screw connection between the top cover 110 and the frame 120, as shown in FIG. 6.

Figure 10:
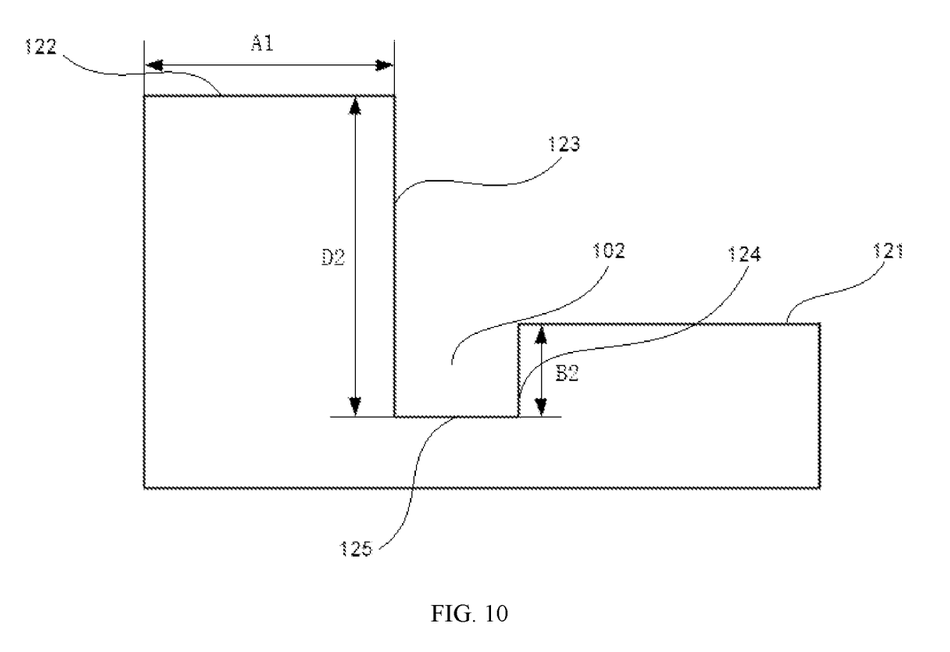
FIG. 10 shows a schematic structural diagram of a second concave-convex structure according to an exemplary embodiment.

In some embodiments, a second concave-convex structure is provided on an outer edge of an end of the frame 120 away from the bottom plate 130. FIG. 10 shows a schematic structural diagram of the second concave-convex structure according to an exemplary embodiment. As shown in FIG. 10, the second concave-convex structure is arranged around an outer edge of a top end of the frame 120, and the second concave-convex structure corresponds to the first concave-convex structure.

Specifically, in the radio frequency laser, the first concave-convex structure on the top cover 110 is arranged opposite to the second concave-convex structure on the frame 120. After the top cover 100 is fixedly installed with the frame 120, as shown in FIG. 7 to FIG. 11, the first concave-convex structure and the second concave-convex structure form a radiation protection structure that has an effect of preventing an electromagnetic radiation from overflowing.

Figure 7:
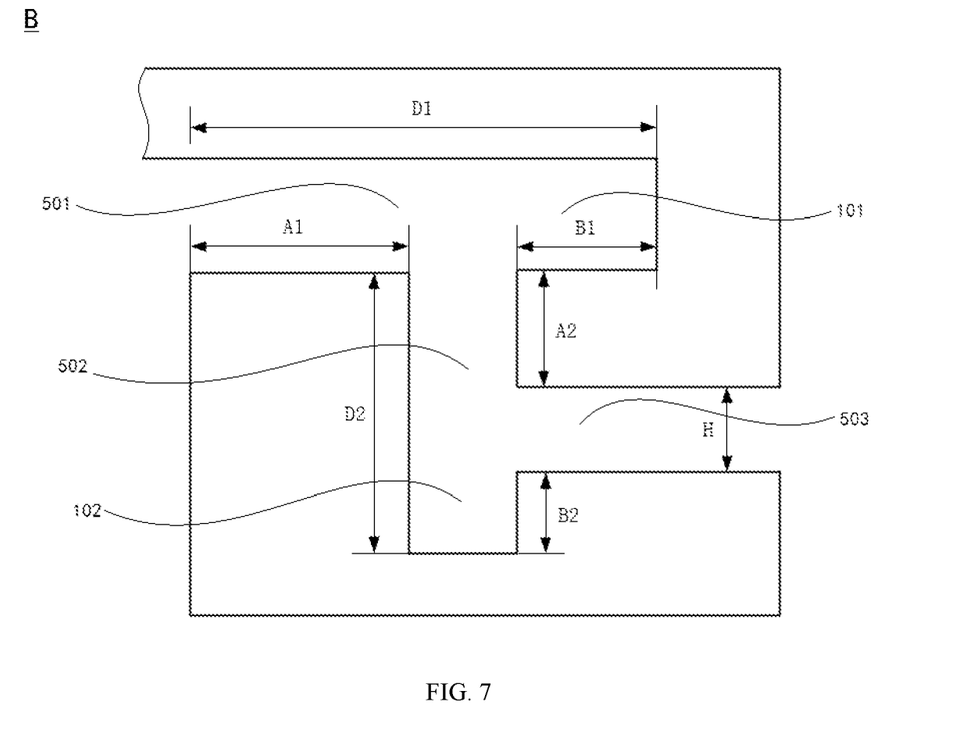
FIG. 7 shows a partial enlarged view of part B in FIG. 1.
Figure 8:
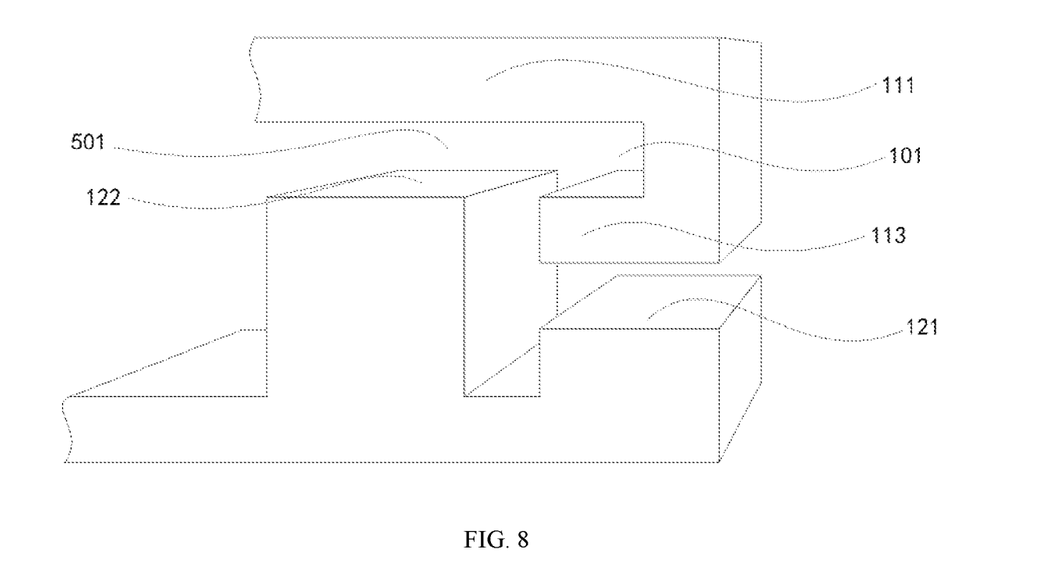
FIG. 8 shows a three-dimensional view of a radiation protection structure according to an exemplary embodiment.

FIG. 7 shows a schematic diagram of a planar structure of the radiation protection structure, and FIG. 8 shows a schematic diagram of a three-dimensional structure of the radiation protection structure. As shown in FIG. 7 and FIG. 8, an inner wall of the radiation protection structure is constructed as a smooth metal layer, which may effectively reflect an electromagnetic radiation, so as to prevent the electromagnetic radiation from overflowing through a gap between the edge of the top cover 110 and the top end of the frame 120 and attenuate an intensity of the electromagnetic radiation overflowing through the gap between the edge of the top cover 110 and the top end of the frame 120.

In some embodiments, as shown in FIG. 7, FIG. 8 and FIG. 9, the first concave-convex structure includes a top cover body 111, a top cover side wall 112, and a top cover end portion 113. A first blind groove 101 is formed between the top cover end portion 113 and the top cover body 111, and the first blind groove 101 is arranged around an outer edge of the top cover body 111. The first blind groove 101 includes a first side wall 114, a second side wall 115, and a first bottom surface 116.

A distance between the first side wall 114 and the second side wall 115 is equal to a perpendicular distance between the first side wall 114 and a second end surface 122. The distance between the first side wall 114 and the second side wall 115 is H. One end of the second side wall 115 extends towards a center of the top cover 110 to a vertical plane where the fourth side wall 124 is located, so that the distance between an end surface of the top cover end portion 113 and the third side wall 123 is also H.

In some embodiments, as shown in FIG. 7 to FIG. 10, the second concave-convex structure includes a first end surface 121 and a second end surface 122. The first end surface 121 is arranged around the outer edge of the top end of the frame 120, and the second end surface 122 is arranged around an inner edge of the top end of the frame 120. Taking the bottom surface of the frame 120 as a reference, a height of the first end surface 121 is below a height of the second end surface 122.

In some embodiments, a second blind groove 102 is provided between the first end surface 121 and the second end surface 122. The second blind groove 102 is formed in a direction from the first end surface 121 to the bottom plate 130. The second blind groove 102 includes a third side wall 123, a fourth side wall 124, and a second bottom surface 125. The third side wall 123 is arranged opposite to the fourth side wall 124, and a height of the third side wall 123 is above a height of the fourth side wall 124, so as to form a step portion to block an overflow of radiation. A distance between the third side wall 123 and the fourth side wall 124 is H, which is about 5%~10% of an overall height of the frame 120. A too large distance H may affect a stability of the frame 120, while a too small distance H is insufficient to eliminate a vertical reflection.

In some embodiments, after the top cover 110 and the frame 120 of the power box 100 are combined, the radiation protection structure includes a first isolation groove 501, a second isolation groove 502, and a third isolation groove 503, all of which have a width of H.

The first isolation groove 501 is a portion formed by the first blind groove 101 extending towards a center of the top cover 110 to an inner side wall of the top cover 110 along the first side wall 114. An electromagnetic radiation may first enter into the radiation protection structure through the first isolation groove 501, and is then reflected by the first blind groove 101 in the first isolation groove 501, so that one part of the electromagnetic radiation returns into the frame 120, and the other part enters into the second isolation groove 502.

The second isolation groove 502 is a portion formed by the second blind groove 102 extending towards the top cover 110 to the first isolation groove 501 along the third side wall 123, and the second isolation groove 502 is perpendicular to the first isolation groove 501. The third isolation groove 503 is formed by the first end surface 121 and a lower surface of the top cover end portion 113. The third isolation groove 503 is perpendicular to the second isolation groove 502 and extends from the first end surface 121 to an outside of the power box 100. The third isolation groove 503 is connected to the outside.

The part of the electromagnetic radiation that enters into the second isolation groove 502 from the first isolation groove 501 may be reflected by the second bottom surface 125 of the second blind groove 102. Most of the electromagnetic radiation may be reflected back into the first isolation groove 501. The remaining small part of the electromagnetic radiation may enter into the third isolation groove 503, and is almost consumed during a transmission process in the third isolation groove 503, so that an influence of the electromagnetic radiation may be ignored.

In some embodiments, the radiation protection structure may meet relationships of: D1≥20H; D2≥20H; A1=B1+H=½ D1; A2=B2+H=½ D2. D1 represents a distance between the inner side wall of the frame 120 and the first bottom surface 116; D2 represents a distance between the second end surface 122 and the second bottom surface 125; A1 represents a width of the second end surface 122; A2 represents a thickness of the top cover end portion 113; B1 represents a depth of the first blind groove 101, which is a distance from the fourth side wall 124 to the first bottom surface 116; B2 represents a depth of the second blind groove 102, which is a distance from the first end surface 121 to the second bottom surface 125; and H represents a distance between the lower surface of the top cover end portion 113 and the first end surface 121. When the radiation protection structure meets the above relationships, the electromagnetic waves entering into the radiation protection structure may almost not radiate out from the gap between the top cover and the edge of the frame, so that a radiation protection is achieved.

In some embodiments, when an electromagnetic radiation enters into the radiation protection structure to form a reflective transmission, the electromagnetic radiation first enters into the first isolation groove 501. The electromagnetic radiation has a first reflection coefficient of £1 in the first isolation groove 501, and the first reflection coefficient £1 may meet a relationship of £1=(D1−H)/D1 in the first blind groove 101.

Figure 11:
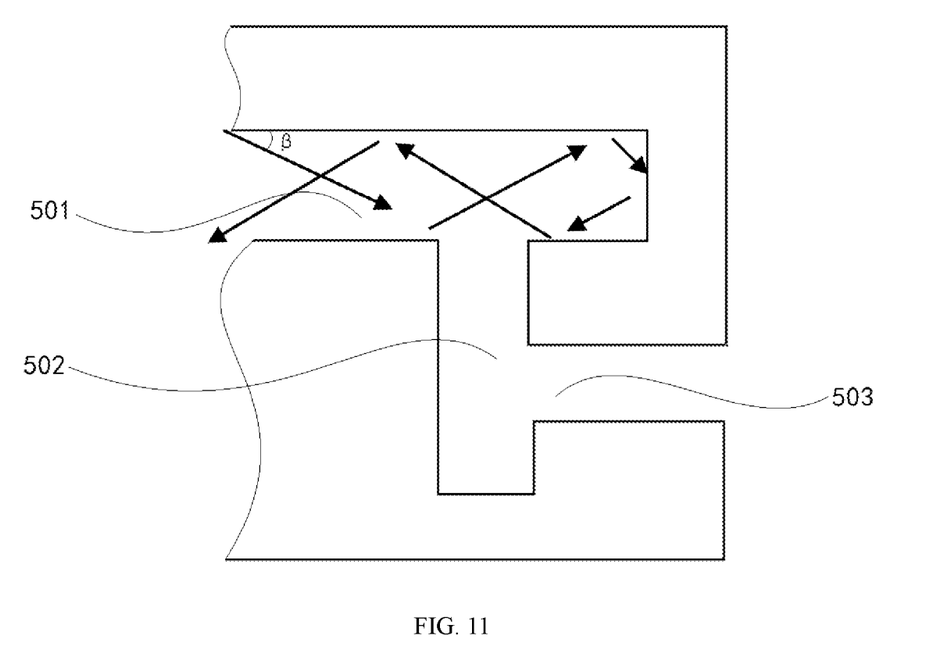
FIG. 11 shows a schematic diagram of a reflection of an electromagnetic radiation entering into the radiation protection structure according to an exemplary embodiment.

In some embodiments, an incident angle at which the electromagnetic radiation enters into the first isolation groove 501 is β. FIG. 11 shows a schematic diagram of a reflection of the electromagnetic radiation entering into the radiation protection structure according to an exemplary embodiment. As shown in FIG. 11, when the incident angle meets β=45°, the radiation waves may pass through the radiation protection structure and be emitted from the third isolation groove 503. When the incident angle meets 90°≤β≤180° or −180°≤β≤−90°, the electromagnetic radiation is directly reflected back into the power box 100. According to experimental measurements, electromagnetic radiation energy entering into the first isolation groove 501 accounts for about 1/180 of energy E entering into the radiation protection structure. In this case, the influence of the electromagnetic radiation may be ignored.

When the incident angle of the electromagnetic radiation meets −45°<β<45°, part of the electromagnetic radiation may be reflected back into the power box 100 by the second blind groove 102. Electromagnetic radiation energy E1 reflected back into the power box 100 accounts for about half of the energy E entering into the radiation protection structure, that is, electromagnetic radiation energy E1≈½£1*E is reflected back into the power box 100.

When the incident angle of the electromagnetic radiation meets 45°<β<90° or −90°<β<−45°, the electromagnetic radiation may be reflected by the inner wall of the first isolation groove 501 and enter into the second isolation groove 502 of the radiation protection structure to form a reflective transmission. The electromagnetic radiation has a second reflection coefficient of £2 in the second blind groove 102, and the second reflection coefficient £2 meets a relationship of £2=(D2−H)/D2. The reflected electromagnetic energy in the second isolation groove 502 is E2. The electromagnetic radiation energy E2 entering into the second isolation groove 502 accounts for about ½ of the energy E entering into the radiation protection structure. In this case, the electromagnetic radiation energy E2≈½£2*E is reflected back to the power box 100. Then the remaining radiation energy is E0=E−E1−E2.

In some embodiments, take D1=20H and D2=20H, then £1=(20H−H)/20H=0.95, £2=(20H−H)/20H=0.95, and the remaining radiation energy E0=E−E1−E2=E−½£1*E−½£2*E=0.05E. Accordingly, the electromagnetic radiation energy that may pass through the gap is 0.05E, which may be expressed in decibels as 20 log E0/E≈−26 db. Therefore, the improved radiation protection structure may attenuate the intensity of the radiated electromagnetic waves by 26 dB.

To increase the db number of the attenuation, it is possible to appropriately increase the depth of the first blind groove 101 and/or the second blind groove 102 while keeping the gap height H unchanged, that is, to increase the value(s) of D1 and/or D2, or increase the number of 90° turns.

It is also possible to improve the electromagnetic wave attenuation effect by enhancing a smoothness of an internal surface of the radiation protection structure (that is, increasing the first reflection coefficient to £1 and the second reflection coefficient to £2) and a base angle processing sharpness of the first blind groove 101 and the second blind groove 102.

The present disclosure may be implemented to effectively attenuate the intensity of the electromagnetic radiation overflowing from the gap of the power box 100, through the first metal blocking ring 400 and the radiation protection structure. In the present disclosure, the connection gap between the top cover 110 and the frame 120 of the power box is designed as a radiation protection structure that may allow the electromagnetic radiation to enter. The radiation protection structure includes three connected isolation grooves and two 90° turning structures, so that the electromagnetic radiation energy passing through the second isolation groove 502 may be greatly reduced compared to the energy entering into the first isolation groove 501, thereby achieving the purpose of reducing radiation.

For specific structures, operating principles and beneficial effects of the radio frequency laser provided in the embodiments of the present disclosure, reference may be made to the radio frequency laser described in any of the above embodiments, and details will not be repeated here.

It should be noted that various embodiments in the specification are described in a progressive manner. Each embodiment focuses on its difference from other embodiments, and the same or similar parts between the various embodiments may be referred to each other. For the system or device disclosed in the embodiments, the description is simple as it corresponds to the method disclosed in the embodiments. For relevant information, reference may be made to the description of the method part.

The above embodiments are just used to illustrate technical solutions of the present disclosure, but not to construct limitations. Although the present disclosure has been described in detail with reference to the aforementioned embodiments, those ordinary skilled in the art should understand that modifications may be made to the technical solutions described in the aforementioned embodiments, or equivalent substitutions may be made to some technical features therein. Such modifications or substitutions may not cause an essence of the corresponding technical solutions to deviate from the spirit and scope of the technical solutions of various embodiments of the present disclosure.

What is claimed is:

1. A radio frequency laser, comprising:
a power box comprising a bottom plate, wherein the bottom plate is provided with a first installation hole and a first installation groove, and the first installation groove is arranged around the first installation hole;
a radio frequency cavity configured to store gas, wherein the radio frequency cavity comprises a top plate provided with a second installation hole and a second installation groove, the second installation groove is arranged around the second installation hole, and when the power box is assembled with the radio frequency cavity, the second installation hole corresponds to the first installation hole, and the second installation groove corresponds to the first installation groove;
an electrode, wherein one end of the electrode is arranged in the first installation hole, and at least part of the other end of the electrode passes through the second installation hole and extends into the radio frequency cavity to ionize the gas; and
a first metal blocking ring, wherein the first metal blocking ring is arranged in the first installation groove and the second installation groove to prevent an electromagnetic radiation from overflowing through a gap between the bottom plate and the top plate,
wherein the bottom plate is further provided with a third installation groove arranged around the first installation groove;
wherein the top plate is further provided with a fourth installation groove arranged around the second installation groove; and when the power box is assembled with the radio frequency cavity, the third installation groove corresponds to the fourth installation groove; and
wherein a second metal blocking ring is provided in the third installation groove and the fourth installation groove to prevent an electromagnetic radiation from overflowing through a gap around the first metal blocking ring.

2. The radio frequency laser according to claim 1, wherein a height of the second metal blocking ring is above a height of the first metal blocking ring in a height direction of the radio frequency laser.

3. The radio frequency laser according to claim 2, further comprising:
an elastic member provided on a side of the first metal blocking ring and/or the second metal blocking ring away from the power box, wherein the elastic member is configured to allow the first metal blocking ring and/or the second metal blocking ring to have a trend of approaching the power box, so as to reduce a gap between the power box and a top end of the first metal blocking ring and/or the second metal blocking ring.

4. The radio frequency laser according to claim 1, wherein the power box further comprises:
a top cover, wherein a first concave-convex structure is provided around an edge of the top cover; and
a frame, wherein two planes of the frame are connected to the top cover and the bottom plate respectively, a second concave-convex structure is provided on an outer edge on a side of the frame away from the bottom plate, and the second concave-convex structure is arranged around an outer edge of a top surface of the frame,
wherein the second concave-convex structure corresponds to the first concave-convex structure, and the first concave-convex structure and the second concave-convex structure form a radiation protection structure to attenuate an intensity of an electromagnetic radiation overflowing through a gap between the edge of the top cover and a top end of the frame.

5. The radio frequency laser according to claim 4, wherein the first concave-convex structure comprises a top cover body, a top cover side wall, and a top cover end portion; and
wherein a first blind groove is formed between the top cover end portion and the top cover body, the first blind groove is arranged around an outer edge of the top cover body, and the first blind groove comprises a first side wall, a second side wall, and a first bottom surface.

6. The radio frequency laser according to claim 5, wherein the second concave-convex structure comprises:
a first end surface arranged around an outer edge of the top end of the frame;
a second end surface arranged around an inner edge of the top end of the frame; and
a second blind groove arranged between the first end surface and the second end surface and formed in a direction from the first end surface to the bottom plate, and the second blind groove comprises a third side wall, a fourth side wall, and a second bottom surface,
wherein a height of the first end surface is below a height of the second end surface.

7. The radio frequency laser according to claim 6, wherein the radiation protection structure meets relationships of:

$D1 \geq 20H;$ $D2 \geq 20H;$ $A1 = B1 + H = \frac{1}{2}D1;$ $A2 = B2 + H = \frac{1}{2}D2,$ wherein D1 represents a distance between an inner side wall of the frame and the first bottom surface, D2 represents a distance between the second end surface and the second bottom surface, A1 represents a width of the second end surface, A2 represents a thickness of the top cover end portion, B1 represents a depth of the first blind groove, B2 represents a depth of the second blind groove, and H represents a distance between a lower surface of the top cover end portion and the first end surface.

8. The radio frequency laser according to claim 7, wherein the electromagnetic radiation is allowed to enter into the radiation protection structure to form a reflective transmission, a first reflection coefficient in the first blind groove is £1, and the first reflection coefficient £1 meets a relationship of £1=(D1−H)/D1.

9. The radio frequency laser according to claim 7, wherein the electromagnetic radiation is allowed to enter into the radiation protection structure to form a reflective transmission, a second reflection coefficient in the second blind groove is £2, and the second reflection coefficient £2 meets a relationship of £2=(D2−H)/D2.

* * * * *